(12) United States Patent
Doktycz et al.

(10) Patent No.: US 6,436,346 B1
(45) Date of Patent: Aug. 20, 2002

(54) MICRO-MACHINED CALORIMETRIC BIOSENSORS

(75) Inventors: Mitchel J. Doktycz, Knoxville; Charles L. Britton, Jr., Alcoa; Stephen F. Smith, Loudon, all of TN (US); Patrick I. Oden, Plano, TX (US); William L. Bryan, Knoxville, TN (US); James A. Moore, Powell, TN (US); Thomas G. Thundat; Robert J. Warmack, both of Knoxville, TN (US)

(73) Assignee: U T Battelle, LLC, Oak Ridge, TN (US)

( * ) Notice: Subject to any disclaimer, the term of this patent is extended or adjusted under 35 U.S.C. 154(b) by 0 days.

(21) Appl. No.: 09/395,630

(22) Filed: Sep. 14, 1999

(51) Int. Cl.[7] ............................................ G01N 25/20
(52) U.S. Cl. ...................... 422/51; 436/147; 73/24.06; 73/25.01; 374/45; 374/12; 438/54
(58) Field of Search ......................... 422/51; 436/147; 73/24.06, 25.01, 23.31; 374/45, 12; 356/328; 430/315; 219/544; 438/54

(56) References Cited

U.S. PATENT DOCUMENTS

| | | | | |
|---|---|---|---|---|
| 4,549,427 A | * | 10/1985 | Kolesar, Jr. ................. | 73/24.01 |
| 5,345,213 A | | 9/1994 | Semancik et al. ............ | 338/34 |
| 5,356,756 A | * | 10/1994 | Cavicchi et al. ............. | 430/315 |
| 5,445,008 A | * | 8/1995 | Wachter et al. ............. | 73/24.06 |
| 5,451,371 A | * | 9/1995 | Zanini-Fisher et al. ........ | 422/51 |
| 5,464,966 A | * | 11/1995 | Gaitan et al. ................ | 219/544 |
| 5,719,324 A | * | 2/1998 | Thundat et al. ............. | 73/24.01 |
| 5,801,070 A | * | 9/1998 | Zanini-Fisher et al. ........ | 438/54 |
| 5,813,764 A | * | 9/1998 | Visser et al. ................. | 374/12 |
| 5,834,627 A | * | 11/1998 | Ricco et al. ................ | 73/23.31 |
| 5,863,803 A | * | 1/1999 | Zanini-Fisher et al. ........ | 436/147 |
| 5,923,421 A | * | 7/1999 | Rajic et al. .................. | 356/328 |
| 6,095,681 A | * | 8/2000 | Kunt et al. ................... | 374/45 |
| 6,096,559 A | * | 8/2000 | Thundat et al. ............. | 436/147 |

FOREIGN PATENT DOCUMENTS

WO WO 99/17107 4/1999

OTHER PUBLICATIONS

Biosensors & Bioelectronics 8, 89–98 (1993) Bataiilard et al.
Biosensors & Bioelectronics 11(3), 247–252 (1996) Towe and Guildbeau.
IEEE Electron Device Letters, vol. 15, No. 10, (Oct. 10, 1994) Reay et al.
Harold Joseph and Steve Terry, "MEMS Technology Is Poised For Wide–Scale Commercialization," Sensor Technology vol. 45, No. 11, pp. 121/122, 124, 126, May 27, 1997.

* cited by examiner

*Primary Examiner*—Jill Warden
*Assistant Examiner*—Brian Sines
(74) *Attorney, Agent, or Firm*—J. Herbert O'Toole; Nexsen Pruet Jacobs & Pollard, LLC

(57) ABSTRACT

A method and apparatus are provided for detecting and monitoring micro-volumetric enthalpic changes caused by molecular reactions. Micro-machining techniques are used to create very small thermally isolated masses incorporating temperature-sensitive circuitry. The thermally isolated masses are provided with a molecular layer or coating, and the temperature-sensitive circuitry provides an indication when the molecules of the coating are involved in an enthalpic reaction. The thermally isolated masses may be provided singly or in arrays and, in the latter case, the molecular coatings may differ to provide qualitative and/or quantitative assays of a substance.

7 Claims, 3 Drawing Sheets

(a)

(b)

MICRO-MACHINED CALORIMETRIC BIOSENSORS

STATEMENT OF GOVERNMENT RIGHTS

This invention was made with Government support under Contract Number DE-AC05-96OR22464 awarded by the United States Department of Energy to Lockheed Martin Energy Research Corporation and the Government has certain rights in this invention.

FIELD OF THE INVENTION

This invention relates primarily to the use of miniaturization techniques to detect and monitor and control changes on a very small scale. More particularly, it relates to the use of micromachining techniques and micromachinery to provide highly sensitive detectors for use in measuring and selectively controlling changes occurring on a molecular level.

BACKGROUND OF THE INVENTION

One of the most essential requirements for research and diagnostic protocols is the ability to detect and monitor chemical, physical, and biological reactions. There is also a need for sensors and sensor assemblies capable of detecting substances that may be present in very low concentrations. In many operations, gross observation and assays, such as titration procedures, suffice to determine whether a reaction has occurred and the extent to which it has proceeded. Especially where the quantities of reactants are large, the type of reaction is well-known, or a reaction causes a change in state or other characteristic, such as forming a precipitant, gross observation may be sufficient to monitor, characterize, and control a reaction.

In other cases, however, such observation may not be possible, or may not convey the necessary information. For certain types of basic research and diagnostic testing, and in many sensor platform applications, current monitoring or control methods and apparatus are not sensitive enough and may not be capable of detecting the reaction. Moreover, different types of information may be sought that cannot be obtained through testing of an end-product. At the same time it may be, for example, that one or more of the reactants is present in only a very small quantity, or that the end product has not been sufficiently characterized for a suitable assay to have been created.

Also, a particular project may require simultaneous monitoring of many reactions. More difficult still, the project may require such monitoring of many different types of reactions. Biocatalysts such as enzymatic proteins catalyze chemical reactions and provide specificity. Another example is the testing of pharmaceutical chemicals. It can be of great utility to sense when a particular formulation causes even the beginning of a desired reaction, or which of two or more closely related formulations drives a reaction further in the desired direction. Monitoring such activity can identify promising structures in the development of new pharmaceuticals.

The types of reactions mentioned above are only examples of the wide variety of types of reactions it is desirable to monitor and control. These types of reactions, however, are exceedingly difficult to detect and analyze with current techniques. The variety in the possible interactions, the variety in the degree to which the interactions progress, and the vast differences in the molecules to be surveyed prevent simple schemes. Signal transduction techniques such as single tagging schemes using fluorescent, radioactive, or electrochemical labels are not possible or useful. Other techniques with wide applicability and adaptability to parallel analysis requirements are few and undeveloped.

One analytic technique being used currently involves calorimetric sensing. With the available methodologies, however, calorimetric measurements require expensive analytical-grade instruments. These are not suitable or practicable for use in routine diagnostics and for other needs, including certain types of research.

One approach in calorimetric measuring has been to use packed biomolecule reactor beds. These are created by immobilizing the molecule of interest, such as an enzyme or antibody, on a structural support which is in turn placed in a chromatography column. This achieves a high process reactant-to-volume ratio to facilitate temperature measurements. A flowing stream containing the analyte is passed through the column, while thermal sensors record the inflow and outflow temperatures. This technique can only work, however, where there are available large amounts of both the reactant and the analyte.

Another early technique developed a so-called enzyme thermistor, formed by integrating an enzyme and a thermistor-type thermal probe. This technique was workable for enzymatically catalyzed reactions producing large amounts of heat. The thermistor has poor sensitivity and required protective sheathing to prevent the heat from being rapidly dissipated to the in surroundings. Thus the response time of the probe was unsatisfactory, the probe was difficult to construct, and the types of reactions for which it was appropriate were few.

Almost all sensors and platforms for calorimetric sensing are relatively large, and require large amounts of reactants and/or analytes. They are also limited to relatively high energy reactions, which are capable of generating enough heat to be detected and/or measured.

More recently, some miniaturization has been accomplished. Xie et al., *Sensors and Actuators,* B6: 127 (1992) have proposed immobilizing an enzyme onto a micromachined channel. The channel itself is constructed on a planar silicon surface. Measurements, however, were made using conventional thermal sensors placed outside the device.

Bataillard et al. (*Biosensors & Bioelectronics* 8, 89–98 (1993)) and Towe and Guilbeau (*Biosensors & Bioelectronics* 11(3), 247–252 (1996)) have integrated enzymes with micromachined thermopiles. While thermopiles are capable of sensing very small changes in temperature, they are not capable of sensing reactions when only a very small number or small concentration of reactants is involved. Joseph et al. (*Electronic Design,* 121–134 (1997)) has proposed using micromachined structures with thin platinum films for use in calorimetric gas sensing, and Berger et al., in related co-pending application Ser. No. 09/039,707, filed Mar. 16, 1998 and commonly assigned, have used a micromachined bimetallic cantilever for sensing physical transitions. These sensors can be very useful, but are subject and responsive to mechanical forces such as flow that are not necessarily indicative of temperature.

While useful for certain applications, these techniques do not provide the sensitivity, response times, and other characteristics enabling use thereof in most research and diagnoses. There is thus room for improvement in the art.

SUMMARY OF THE INVENTION

It is an object of this invention to provide a micromachined apparatus capable of detecting and measuring very small calorimetric changes.

It is also an object of this invention to provide a method for sensing enthalpic heats of reactions on a very small scale.

It is moreover an object of this invention to provide an array of micromachined thermal sensors, the array capable of sensing different types of enthalpic reactions for different types of molecules.

It is another object of this invention to provide a method and apparatus for detecting and measuring small changes to biomolecules caused by interaction thereof with other molecules or with environmental conditions.

An additional object of this invention is to provide a relatively inexpensive sensor, singly or in arrays, capable of sensing reactions in the presence of minute amounts of reactants and/or analytes.

Another object of the invention is to provide a microminiaturized, thermally isolated sensor or an array of microminiaturized thermally isolated sensors capable of detecting enthalpic changes resulting from reactions occurring in a wide variety of environments.

It is likewise an object of the invention to provide a sensor or array that enables detection of the presence of one or more particular analytes in an environment containing a relatively large number of differing analytes.

These and other objects of the invention are achieved by providing an apparatus for measuring enthalpic changes on a very small scale consisting of a thermally isolated mass; detector means located on said thermally isolated mass for sensing temperature changes adjacent said thermally isolated mass; a molecular layer adjacent said detector means, said molecular layer comprising at least one reactant of an enthalpic reaction; and an output means operatively connected to said detector means for providing an indication of said temperature changes.

These and other objects of the invention are also achieved by providing a method for detecting enthalpic changes on a very small scale consisting of micro-machining a substrate to form a thermally isolated mass; embedding in said thermally isolated mass at least one detector means responsive to changes in enthalpy and capable of providing an output indicative of enthalpic changes; coating said detector means with a molecular layer wherein the molecules of said layer comprise at least one reactant of an enthalpic reaction; and monitoring said output to detect and measure enthalpic changes.

DETAILED DESCRIPTION OF THE INVENTION

Figure 1:
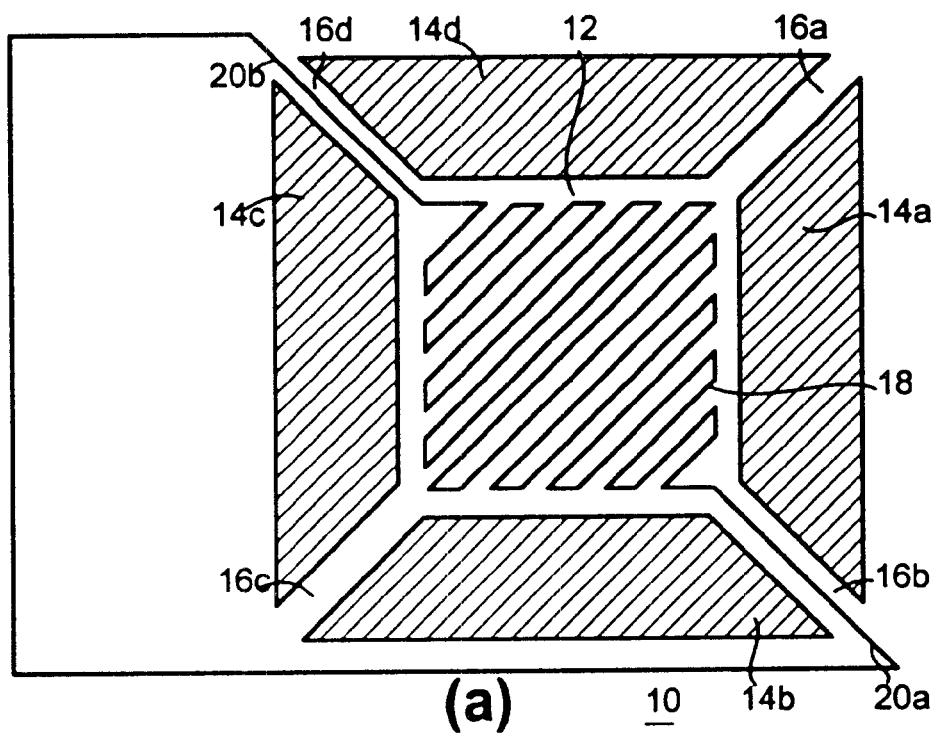
FIG. 1 is an illustrative embodiment of a thermal sensor apparatus according to the invention, wherein is shown (a) a top view and (b) a side view.
Figure 1:
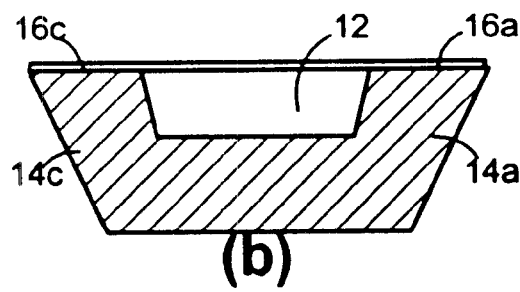

Calorimetry is a classic technique that measures heat (enthalpic) changes accompanying chemical reactions. The elegance of the technique is that it can measure not only reactions such as complete covalent or ionic bonding (or bond breaking), but also more subtle changes. Enzymes, for example, act to catalyze certain reactions. Other molecules, including biologically active ones, may react to chemical or physical events by changes in conformation. These changes may signal the event, which in turn provides an indication of a reaction.

The binding of a chemical ligand, or a change in conformation, almost always contains an enthalpic component. The thermodynamic information, if it can be sensed and measured, can be interpreted to assess structure, stability, binding constants, and/or reactivity. These measures are very useful, and especially in the case of biomolecules such as proteins. The method and apparatus of the current invention can be used for virtually any reaction involving biologically active molecules, which include but are not limited to biopolymers, biochemicals, pharmaceutical preparations, and the like. The invention, however, is not limited to use with biologically active molecules. The apparatus and methods disclosed and claimed herein are capable of a wide range of use in chemical, physical, and biological reactions. Chemical reactions include any organic or non-organic reactions that contain an enthalpic component. Physical reactions include, by way of example and not limitation, changes in state or phase. This can include, e.g., changes in crystalline structure, or the release or absorption of atomic particles as occurs in radionuclear reactions.

Calorimetric change is an intrinsic feature of virtually all physical, chemical, and biological reactions. Essentially any reaction can be monitored through this technique. In the case of biochemical reactions, a reliable calorimetric sensing technique will eliminate the requirement for additional labeling such as fluorescent and electrochemical tagging methods. Alternatively, such a technique can be used in conjunction with labeling to increase the amount and kind of data that can be obtained. This greatly simplifies, and lessens the expense of, experimental procedures and interpretive methods.

A significant problem with calorimetric measurement to date, however, has been the lack of sensitivity of the available sensors. Sensitivity herein refers to the ability to detect enthalpic reactions when the concentration of reactants is very low, or when the amount of reactants in a sample is very low. Most conventional thermal sensors, while capable of detecting very small temperature changes, have thermal masses and heat capacities which are very large relative to the heat of reaction when only a very few reactants are involved, or when the reaction is highly localized. Such sensors thus either cannot detect the reactions, or provide unreliable data. Although, as stated, the current invention is not limited to applications involving biologically active molecules, the problem is particularly acute in this area. Very often, the biochemical reaction of interest takes place between reactants at very low concentrations. This may be the result of the availability of only a very small sample, or the naturally low concentration of a molecule of interest, for example, a particular protein. In pharmaceutical or genetic research, the expense of producing a large amount of the molecule of interest is often a highly significant factor.

In these instances, the total calorimetric or enthalpic change is naturally very small. Enthalpic changes resulting from a very small number of reactions, or from a slight or weak reaction, are referred to herein as micro-volumetric enthalpic changes. A micro-volumetric enthalpic change may range from that caused as described up to a level detectable by more conventional means, that is, the method and apparatus of the current invention are also useful for high volume samples or high concentration samples in addition to micro-volumetric conditions.

In conventional techniques, because the reactants and/or the catalysts, if the latter are involved, are typically in solution, the enthalpic change is not localized. Even if one of the reactants or the catalyst is immobilized, e.g., by binding it to a surface, the problem of detecting and measuring micro-volumetric enthalpic changes persists. Certain environments form a relatively enormous heat sink, quickly dissipating the energy of reaction before it can be measured.

The apparatus and method of the current invention solves this and other problems by providing a micro-miniaturized, thermally isolated platform or mass. An exemplary design of a preferred embodiment of the apparatus is shown in FIG. 1. FIG. 1 is a top view of a sensor structure 10 according to the invention. Structure 10 is preferredly formed from a silicic substrate such as silicon or silicon dioxide. More generally, the substrate may be formed of any substance that can be micro-machined. Silicon is a preferred substrate for small-scale applications such as microcircuitry. Techniques for micro-machining this substrate, employing photolithography and other known techniques, are well-developed, and can be adapted for large-scale production.

In FIG. 1, the sensor structure 10 is formed from a bulk carrier such as a solid mass of silicon. The sensor structure 10 has a platform 12. The platform 12 has been formed by micro-machining, by etching or otherwise, a well in the bulk carrier, indicated by the downwardly sloping peripheral walls 14a–d. The well is shown in a side perspective in FIG. 1(b), showing two of the peripheral walls 14a and 14c. The formation of the well thus thermally isolates the mass of platform 12. Platform 12, as shown in FIG. 1(a) is suspended over or within the well by four bridges or supports 16a–d.

On the thermally isolated mass of platform 12 is formed a resistive thermal detector. In FIG. 1, the resistive thermal detector is shown as formed by a serpentine strip of metal 18. Strip 18 can be added to the platform 12 through the use of methods such as evaporation through a shadow mask, or a lift-off technique, as known to those of skill in the art. Preferably, strip 18 is formed of platinum. Platinum has advantageous features including a high melting temperature, resistance to oxidation in air, relative chemical inertness, and a linear thermal resistance variation through the range of from about −190 to about 400° C. A resistive thermal detector of platinum has a thermal resistance variation in the biologically relevant sensing range such that resolutions on the order of about 0.0001° C. can be achieved.

Strip 18 has connected to it leads 20a and 20b, which in turn are operatively connected to resistance circuitry such that very small changes in resistance due to micro-volumetric enthalpic events can be detected, measured, and monitored. This type of circuitry (not shown) is also well known to those of skill in the art.

Many alternatives are available to the exact device illustrated in FIG. 1(a) and (b). The function of strip 18 can, for example, be performed by a conductive or semi-conductive thin film. While platinum is preferred, other suitable substances can be used, the choice depending on the use and environment in which the device will be used. Also, while the bridges or supports 16 in FIG. 1(a) are shown at each corner of platform 12, more or fewer supports can be employed, again depending on design choices and the experiments for, or environment in which, the resistive thermal detector is intended.

Figure 2:
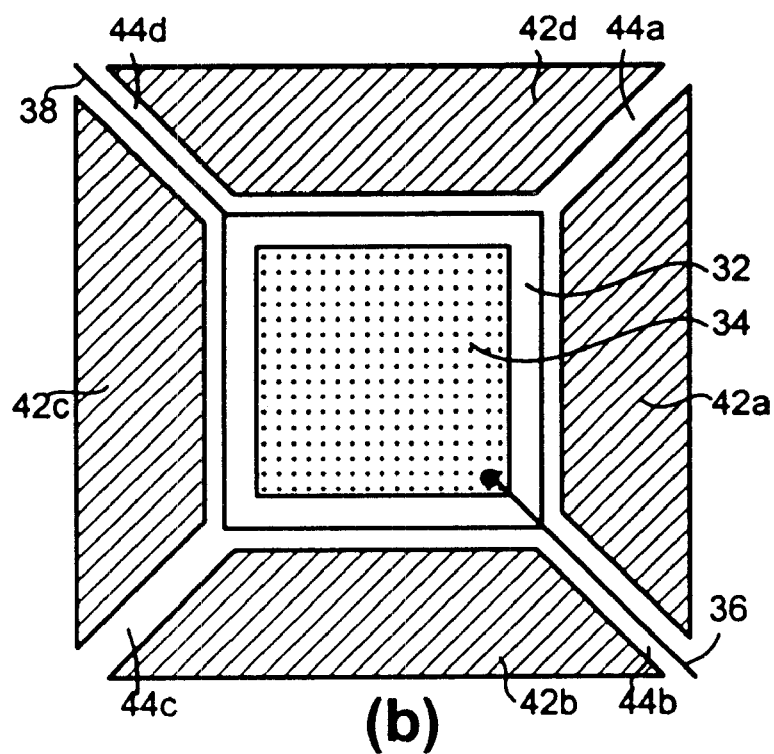
FIG. 2 is an illustrative embodiment of an alternative apparatus for enthalpic measurement according to the invention, showing (a) a top view and (b) a side view of the device.
Figure 2:
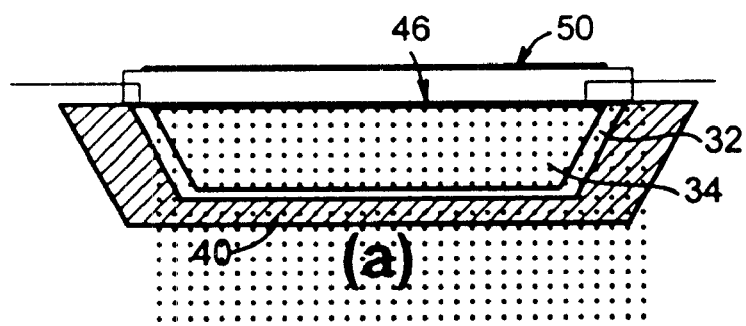

In an alternative preferred embodiment of the apparatus of the invention, a temperature sensor based on a thermally sensitive semiconductor device is used. One well-known example of such a device is a diode, such as is shown in FIG. 2. In this embodiment, a diode is created on the platform comprising the thermally isolated mass. The diode can be created using any standard process for creating a diode, such as bulk-well complementary metal oxide semiconductor (CMOS) processes or bipolar-junction transistor processes, followed by an extra etching step. A sensor of this type is illustrated in FIG. 2.

FIG. 2 illustrates a thermally isolated mass in which is incorporated a thermally sensitive diode. In this embodiment, an n-well 32 is first created in a silicon substrate by n-well diffusion. N-well 32 is shown in cross-section in FIG. 2(a) and as a top view in FIG. 2(b). The n-well 32 is formed to completely surround what will be the thermally isolated mass.

Within n-well 32 is formed a p-diffusion 34. The substrate is then etched by a chemical etchant such as ethylene diamine pyrocatechol (EDP) to anisotropically remove silicon from below n-well 32. As with the apparatus shown in FIG. 1, this forms an open well 40, shown in FIG. 2(a), with walls 42a–d, shown in FIG. 2(b). The etching is accomplished so as to leave bridges or supports 44a–d, again similar to the apparatus shown in FIG. 1. As stated, the supports 44a–d may be created, or left in place, through the use of standard materials and techniques. The materials and techniques used will depend on the material of the substrate, the type of sensor to be used on the platform, and other considerations common to etching techniques. The bridges support a platform generally indicated in FIG. 2(a) as platform 46, which is thermally isolated by the formation of well 40.

The diode of platform 46 is operatively connected to detection and measurement circuitry (not shown) by a cathode contact 38 from n-well 32 and an anode contact 36 from p-diffusion 34. The conductivity of diode 46 is sensitive to changes in enthalpy. The detection and measurement circuitry, which may take any form known to those of skill in the art, will in turn sense and measure changes in conductivity to provide an indication of the micro-volumetric enthalpic changes.

An alternative sensor useful in the current invention is known as proportional-to-absolute-temperature (PTAT) circuitry. Other types of active electronic semiconductor circuits and/or devices are also useful and known to be applicable, including bipolar and field-effect transistors and four-layer devices such as thyristors or silicon-controlled rectifiers (SCRs). The selection of the particular detector will depend on the environment to which it will be exposed, the types of coatings to be applied, and the data to be obtained.

For the operation of either of the sensors described above, a chemical coating is formed on platform 12 or platform 46. This is shown diagrammatically as coating 50 in FIG. 2(a). The coating 50 can be any of a very wide range of substances. The coating 50 may be a reactant, such as an antibody or enzyme, designed to detect and/or measure for the presence of, respectively, antigens or substrates. The coating 50 can also be any of a variety of catalysts or binding recognition agents, if the desired measurement is the occurrence of a reaction, the energy of the reaction, the speed of the reaction, or any of several other variables that can be related to enthalpic changes. The coating 50 can also be, for example, an adsorbent designed to test for the presence of a certain chemical, provided that the adsorption or desorption creates an enthalpic change. The coating can also be selected so as to detect, with great precision, physical changes. These include such phenomena as phase changes, e.g., the melting transition point, changes in crystalline structure, and the measurement of radiation, wherein the change involves an enthalpic component.

The mass of the platforms 12 or 46 is very small. Typically, the surface of the platforms on which the coating is placed can be flat. The surface area can be increased by, e.g., inducing corrugations in the surface or other techniques. Whether the surface is flat or shaped, however, the dimensions of the platform, measured in the x-y plane, are small. The area of the x-y plane is preferably in the range of from about 100 square microns to about 250,000 square microns. Surface effects to enhance reaction area, such as the corrugation mentioned above, may increase the total surface area available for coating without increasing the area of this x-y plane. The silicon dioxide bridges are proportionally smaller. Because the coating 50 is immediately adjacent the sensor device, and because of the thermal isolation, very small enthalpic changes can be detected and measured before the energy diffuses or dissipates into the environment. The enthalpic change is also, of course, highly localized to the thermally isolated mass.

In practice, and with reference to the diode sensor of FIG. 2, a chemical coating of interest is formed atop the diode surface. When a reaction with the reactant of interest occurs, heat energy is either generated (in an exothermic reaction) or absorbed (in an endothermic reaction). Either type of reaction creates a micro-volumetric enthalpic change. The enthalpic change causes in turn a change of some proportion in the temperature of the thermally isolated mass of the diode. The current through a diode is described as:

$$I = I_s e^{(Vq/kT)}$$

where I is the diode current, $I_s$ is a process-and-geometry dependent current, V is the voltage across the diode terminals, and kT/q is the Boltzmann potential.

It is within the skill of the art to create diodes of such size that the thermal sensitivity of the diodes is on the order of microdegrees. Thermal isolation in excess of 10,000° C./watt can be achieved.

Other components or capabilities can be embodied in the two sensor platforms described above. Temperature control of the platform can be achieved by adding, e.g., polysilicon resistors for heating. Polysilicon is a standard material layer commonly used in CMOS processes and can be easily incorporated to provide very fine control. This added temperature control can be used to create a micro-environment held at a certain temperature, or used to hold the coating at a desired temperature to cause or prevent reactions. Additionally, control of the temperature allows controlled increases or decreases in temperature. Enthalpic fluctuations over a controlled, progressive temperature range will indicate the occurrence and energy of reactions.

The temperature of entire sensor chips can be controlled through other means as well. Attaching a Peltier stage to the sensor allows very fine temperature control. Another means of controlling temperature is to vary the material of the supports for the mass, or to add various substances as coatings. The platform can be thermally isolated in a reverse sense by incorporating highly thermally conductive material into the bridges, forming a highly selective heat sink for the platform. In this embodiment, unlike a sensor formed on a large slab, the thermal isolation of the platform is carefully controlled, with likewise controlled heat dissipation rates.

In an alternative embodiment of the thermal detectors described above, the sensors on the platform can be associated with circuitry such as an SCR so as to convert the detector to a "latch" type of sensor. That is, the sensor can be operatively connected to components that automatically detect whether the sensor has detected a predetermined increase or decrease in temperature. Thus, rather than requiring monitoring in real time to determine enthalpic changes, it can be determined simply whether a particular enthalpic change occurred. This type of circuitry, known to those of skill in the art, can be very useful in diagnostic procedures, for example, where the key question is simply whether a reaction occurred, without the need to obtain additionally data that might be desired in a research environment. Additionally, such an embodiment would be very useful in automating testing, diagnostic, and monitoring functions.

Figure 3:
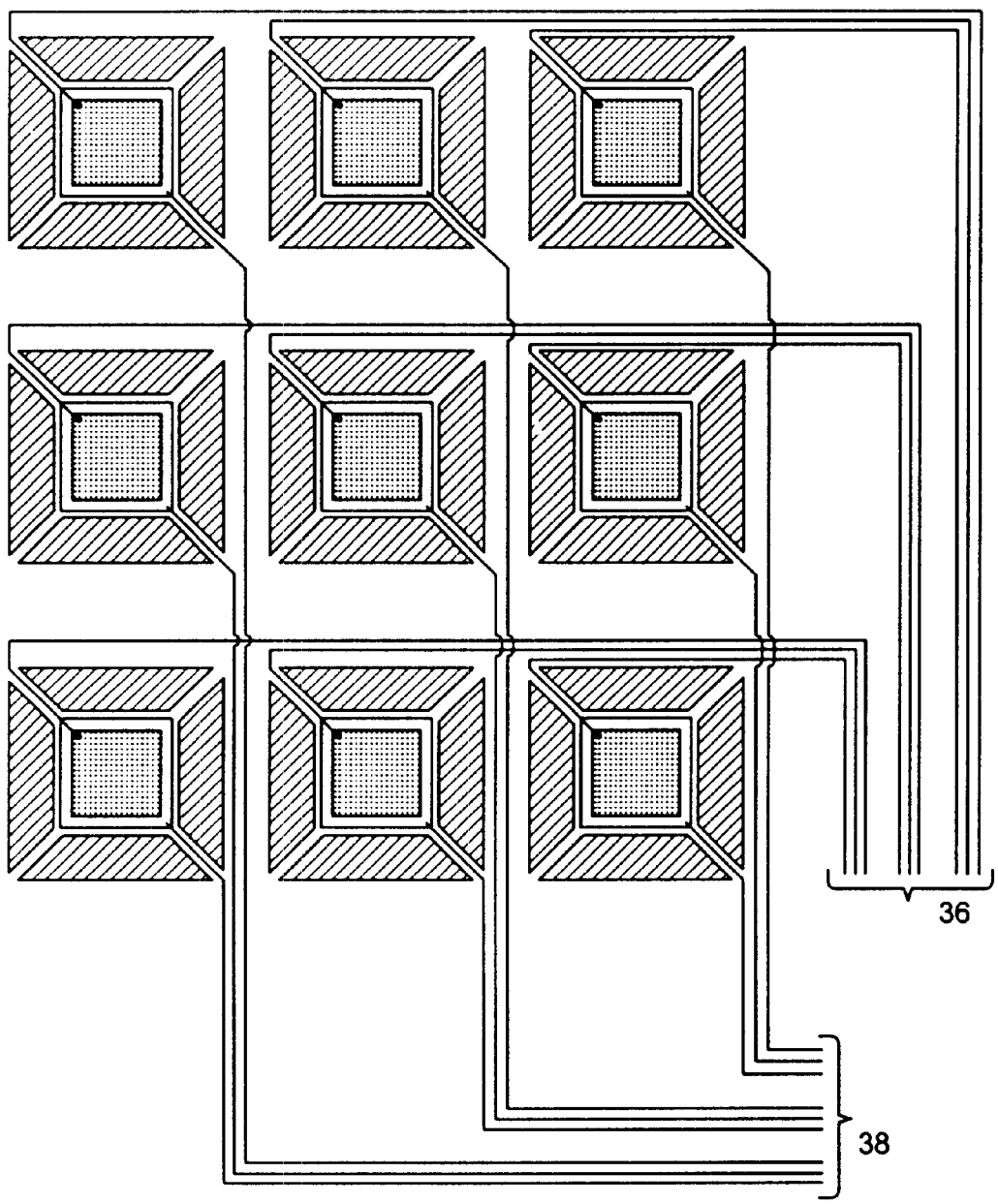
FIG. 3 is a diagrammatic illustration of an array of thermal sensor apparatus according to the invention.

In another embodiment of the invention, mass-production etching techniques can be used to create entire arrays of thermally isolated platforms on a single substrate. The platforms remain thermally isolated, and are isolated from each other. FIG. 3 shows a diagrammatic 3-by-3 array. The elements of FIG. 3 are numbered and identified as for FIGS. 1 and 2. Manufacturing techniques are capable of producing arrays of hundreds or even thousands of such platforms on a single substrate. Each platform can be provided with sensors, heat control units, and output leads. Each sensor platform can be coated with the same molecular substance, thus quickly providing sufficient data for statistical manipulation. Alternatively, different sensors, or different areas of the array, can be coated with different molecular coatings. Such an arrangement would allow very rapid research testing into the efficacy of pharmaceutical compounds, for example. Certain sections of the array can be coated with one substance or type of substance, while other sections can be coated with other compounds. Reaction data for each compound can be obtained, along with almost instantaneous comparison data among the different compounds. Control substances can also be added. A similar arrangement is possible for diagnostics. Arrays could be mass produced with the sensors precoated with antibodies, for example, to form a single, inexpensive, and very rapid test of the presence or absence of various analytes.

In addition to testing the reactivity of each coating in an array, thermal gradients across an array can be measured. Thermal gradients corresponding to different reactions and/or rates thereof can provide data regarding propagation of the reaction through the environmental medium in which the array is placed. Gradient information can provide additional data concerning the reaction, the reaction rates, and the localization thereof within a sample.

One or more thermal sensors can also be associated with or embedded in the array substrate itself. The output data from these sensors enable assessment of the effects of temperature changes in the sample as a whole and/or in the measurement environment, and provide a comparison reading or output for assessing the data being obtained from each individual platform.

The sensors and sensor arrays according to the invention are useful in a wide variety of environments and are capable of functioning in changing environments. Thus, the coatings may include molecular substances capable of detecting analytes in liquids, gases, or solids, and can be used to detect state changes among these states. The sensors and arrays are particularly useful in environments where the ambient substance has a thermal conductivity less than that of the material from which the thermally isolated mass is formed. In these environments, the to enthalpy of the reactions will be even more highly concentrated on the platform or thermal mass, have a concomitantly greater effect on the detector, and thus provide highly reliable data. An aqueous environment, almost universally used in biological testing and diagnostics, is an excellent environment. Because of the thermal conductivity of water as compared to materials such as silicon, the water surrounding the platform tends to act as an adiabatic shield, concentrating the enthalpic effect at or on the platform.

Another particular advantage of the apparatus of the invention is the ability to use it in an environment, such as a biological sample, where the number of analytes present in the sample is relatively high. Because the thermal mass is so small, and the coating can be made so specific, the reaction of interest is localized on the mass. A reaction between the molecules of the coating and the analyte of interest can therefore be detected despite the presence of many other analytes. The more specific to a given analyte the coating is, as in the case of a particular enzyme or antibody, the more precise the detection can be. Conversely, an array of sensors can be created wherein each or each of several masses or platforms within the array carry a particular coating, thus presenting a number of different detector molecules to a sample. This enables the quick analysis, for example, of the presence of a particular analyte or particular group of analytes within the environment.

Those of skill in the relevant arts will be able to see many possible variations in structure and use of the claimed invention. The use of different sensor platforms and different coatings will allow a wide variety of uses. Different types of sensors might be constructed within a single array, allowing different types of enthalpic measurements, or measurements on different scales, to be made with one overall structure. It is an aspect of this invention that the novel sensor platforms, arrays, and methods, and the novel capabilities thereof, are made available through the use of standard micro-machining techniques. The apparatus of the invention are therefore relatively inexpensive and can be made widely available. The scope of the invention is not limited by the exemplary structures and methods provided above. Variations in and changes to the described invention are possible within exceeding its scope, which is to be determined with reference to the following claims.

What is claimed is:

1. An apparatus for measuring micro-volumetric enthalpic changes comprising:
    at least one thermally isolated mass;
    at least one detector means located on said thermally isolated mass;
    at least one molecular layer adjacent said detector means, said molecular layer comprising at least one reactant of an enthalpic reaction; and
    at least one output means operatively connected to said detector means for providing an indication of said temperature changes;
    wherein said at least one detector means is selected from the group consisting of proportional-to-absolute temperature circuitry and temperature sensitive diodes.

2. An apparatus according to claim 1 wherein said detector means is at least one temperature sensitive diode.

3. An apparatus according to clam 1 wherein said molecular layer comprises biologically active molecules.

4. An apparatus according to claim 1 further comprising at least one control means operatively connected to said thermally isolated mass for selectively controlling the temperature thereof.

5. An apparatus for measuring micro-volumetric enthalpic changes in a plurality of samples comprising an array of the apparatus according to claim 1.

6. An apparatus according to claim 5 wherein the detector means are the same.

7. An apparatus according to claim 5 wherein the detector means are different.

* * * * *